Nov. 6, 1962 W. H. ZEHNER 3,062,600
RECIPROCATING PLUNGER STRUCTURE
Filed Oct. 30, 1961
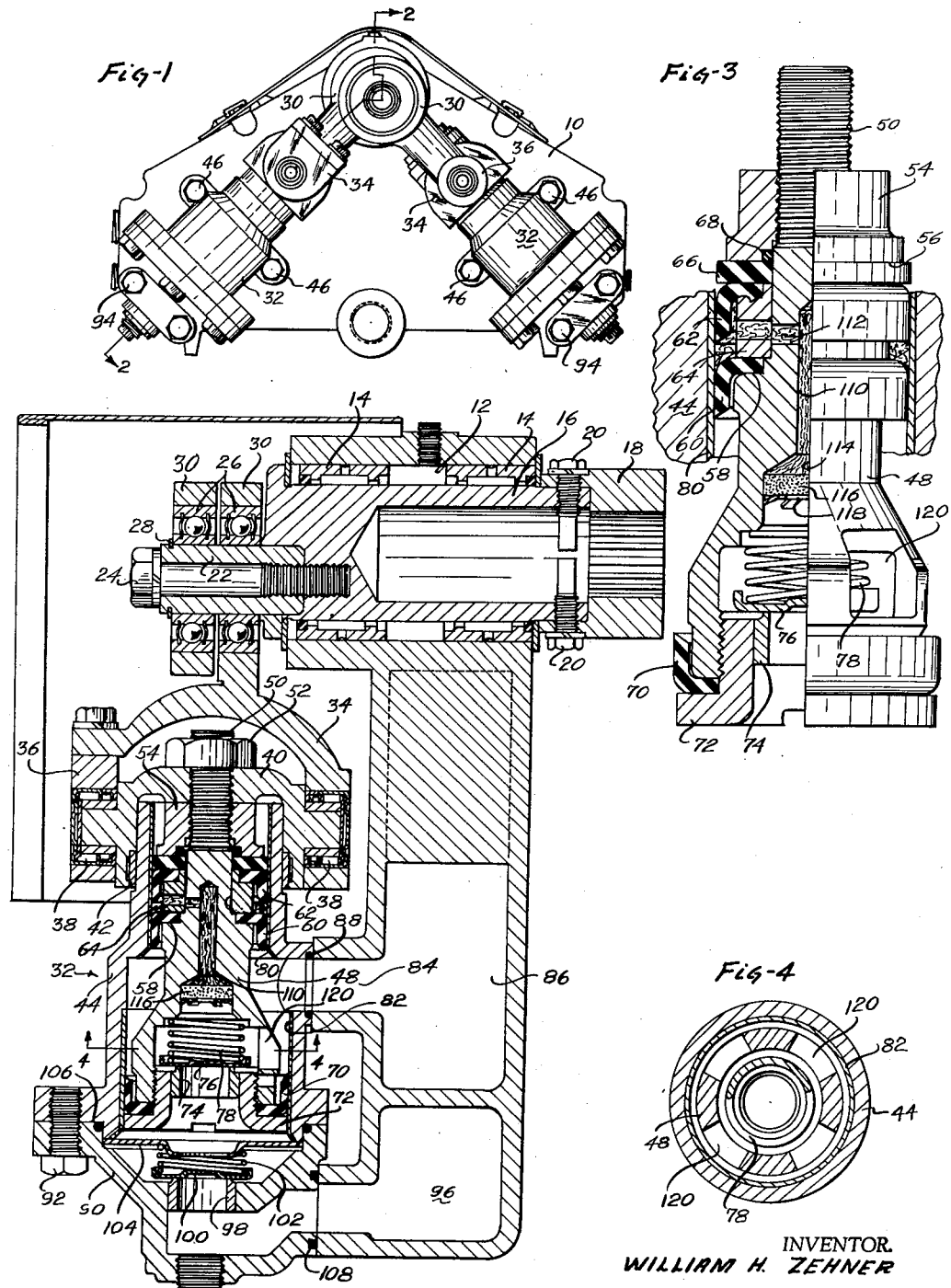
INVENTOR.
WILLIAM H. ZEHNER
BY
Toulmin & Toulmin
ATTORNEYS

United States Patent Office 3,062,600
Patented Nov. 6, 1962

3,062,600
RECIPROCATING PLUNGER STRUCTURE
William H. Zehner, Ashland, Ohio, assignor to F. E. Myers & Bro. Co., Ashland, Ohio, a corporation of Ohio
Filed Oct. 30, 1961, Ser. No. 148,544
6 Claims. (Cl. 309—6)

This invention relates to an improved plunger structure for reciprocating pumps, and is particularly concerned with an improved sealing arrangement therefor for preventing leakage passed the plunger, for lubricating the plunger and maintaining the lubricated area free of foreign matter.

Reciprocating plunger pumps are well known and are generally employed where it is desired to develop a fairly high pressure, or to have positive delivery, or both. Such pumps, for example, are employed in connection with foliage sprayers where it is necessary to develop high pressures on the material being pumped and sprayed, so that the sprayed material will travel a required distance and impinge upon the foliage being sprayed with the proper velocity to insure full coverage. Sprayers of this nature will develop pressures up to, for example, 500 pounds or more, which require the use of a reciprocating plunger pump in order to maintain this pressure.

It is in particular connection with the sealing and lubricating of a pump plunger for reciprocating piston pumps that the present invention is concerned.

The object of the present invention is the provision of an improved plunger structure for a reciprocating plunger pump which will be substantially no more expensive than prior plungers of this nature, but which will be greatly improved with regard to sealing and wearing characteristics.

A still further object of this invention is the provision of a plunger for a reciprocating plunger pump in which liquid materials carrying abrasive particles can be passed through the pump without damage to the pump plunger or the cylinder in which it reciprocates.

A particular object of this invention is the provision of a pump plunger having multiple sealing cups theron in which the sealing cups are adequately lubricated at all times and thereby increasing the service life of the pump embodying the plunger.

These and other objects of this invention will become apparent by reference to the following detailed description and accompanying drawings wherein:

FIGURE 1 is an elevational view of a plunger pump adapted for having plungers therein constructed according to the present invention;

FIGURE 2 is a sectional view indicated by line 2—2 on FIGURE 1 and drawn to somewhat enlarged scale;

FIGURE 3 is a view of the plunger according to this invention, drawn to enlarged scale and partly in section, showing more in detail the plunger construction; and FIGURE 4 is a sectional view indicated by line 4—4 on FIGURE 2.

Referring to the drawing somewhat more in detail the pump structure illustrated therein comprises a body or air chamber part 10 having at the upper end a bore 12 in which bearings 14 are mounted for supporting a drive shaft 16 for the pump. This drive shaft is adapted for being driven in a suitable manner as, for example, by the splined drive cap 18 held in place on the shaft by screw 20 and adapted for engaging a splined drive shaft, such as the power take-off shaft of a tractor.

Shaft 16 has connected thereto in an eccentric position a crank pin 22 held on to the shaft by a cap screw 24. Crank pin 22 has bearings 26 mounted thereon, with the bearings being retained in place by a snap ring 28. Each bearing is received within the eye of a link 30, each of which extends into a different one of the cylinders 32, which, as will be seen in FIGURE 1, are attached to air chamber 10 and inclined at angles to each other.

Each link at its end opposite crank pin 22 has an integral eye portion 34 and a detachable eye portion 36, which portions receive bearings 38 that receive opposite ends of a cross head 40. The crosshead embodies a central bore in which there is mounted a sleeve bearing 42 that slidably engages an outer machined surface of cylinder body 44. This cylinder body is retained by cap screws 46, illustrated in FIGURE 1, on the air chamber 10.

Inside cylinder body 44 is a piston or plunger 48 that has a threaded part 50 on the upper end extending through cross head 40 and receiving nut 52. On the underside of the cross head the threaded portion 50 of the piston or plunger has threaded thereto a follower nut 54. The follower nut has retained between its lower face 56 and upwardly face shoulder 58 of the plunger the spacer cups 60 and 62, which are preferably of a rubber-like material, for example, a synthetic rubber that is resistant to oil and grease. The plunger receives a spacer member 64 located between the upper and lower cups and there is a rubber-like washer between the top of the upper cup and the surface 56 of follower nut 54.

A rubber-like O-ring 68 seated in an under-cut in the bottom face of the follower nut 54 seals between the follower nut and the plunger and washer 66. Below the lower cup 60 the diameter of the plunger enlarges and on the lowermost end of the plunger is a larger cup 70 which opens upwardly and which is retained in position on the plunger by a follower nut 72, threaded to the inside of the lower end of the plunger and being hollow. This follower nut in the center has a stainless steel ring 74 forming a seat for a check valve disc 76 that is spring urged toward the seat by compression spring 78.

Reference to FIGURE 2 will show that the plunger described is disposed in a cylinder block 44 with the upper cups fitting in a smaller diameter portion of the cylinder in a stainless steel sleeve 80, whereas the lower cup 60 of the plunger is disposed in a larger bore in the cylinder block engaging with stainless steel sleeve 82.

The cylinder block between the larger and small diameter bores communicates by way of a passage 84 with outlet chamber 86 in the air chamber or body 10. The cylinder block, about this communicating passage, is sealed by the rubber-like O-ring 88.

At its lower end cylinder block 44 receives a lower cap member 9 connected to the cylinder block by cap screws 92 and in turn connected to the air chamber by cap screws 94 which are seen in FIGURE 1. The cap 90 has a passage therethrough leading from inlet chamber 96 in air chamber 10 into the cap, and then upwardly through an annular stainless steel seat member 98 into the chamber formed at the lower end of the cylinder block by cap 90.

A valve disc 100 is urged toward ring 98 by compression spring 102 which bears at its upper end on a retainer disc 104 that is clamped in place against the bottom end of the cylinder block by the cap 90. A seal ring 106 is clamped between the cap and the cylinder block, and another seal ring 108 is clamped between the said cap and air chamber 10.

A feature of the present invention resides in the cavity 110 provided in the plunger 48, which at its upper end communicates via passage 112 with the space between the cups 60 and 62, while at its lower end this cavity communicates with the upper end of a somewhat enlarged chamber 114.

In the plunger chamber 114 is a disc member 116 which is a filter disc that will permit fluid to pass therethrough, but which will not permit the passage of particulate material. This filter disc is retained in place in chamber 114 by a washer-like spring retainer 118.

According to the present invention the cavity 110 is packed with a waterproof grease and the entire space from the filter disc to the inside of sleeve 80 between the cups 60 and 62 is filled with the grease. This provides a reserve reservoir of grease of substantial capacity, which will be pressured by pressure fluid action through disc 116.

In this manner the cups and the upper portion of the cylinder block are maintained adequately lubricated and sealed for a long period of time and the entry of abrasive material into the upper end of the cylinder block is prevented.

The grease further provides an arrangement whereby the pressure on opposite sides of the lower cup is substantially equalized, so that this cup has merely a wiping action to carry out.

The net result is an extremely long service life of the plunger, a better sealing of the plunger and a substantially complete exclusion of all foreign particles from the upper end of the cylinder block.

In operation the shaft 16 is driven in rotation and this will cause reciprocation of the plungers; on their upward movement the plungers increase the size of the chamber at the bottom of the cylinder block, and this will draw liquid in to inlet chamber 96 through ring 98 past valve disc 100 and thence up through the central aperture in retainer disc 104. When the plunger is then thrust downwardly, this fluid is displaced upwardly through ring 74 and past valve disc 76 into the cylinder block and flows therefrom through passage 84 into outlet chamber 86.

On account of the differential area of the pump plunger, the next upward movement of the plunger will, simultaneously withdrawing fluid in from the inlet, expel still further fluid to the outlet chamber.

It will be evident that the pressure fluid, since it will stand in the region between the upper and lower ends of the plunger, will act through the apertures 120 of the plunger through which the fluid flows from the bottom of the plunger to the upper side of the lower part thereof, and maintain pressure, through the filter disc, on the body of waterproof grease retained in the cavity provided therefor in the plunger.

It will be evident also that all of the benefits of the present invention do not arise out of the fact that there is a body of lubricant retained in the space between the sealing cups. The arrangement of this invention is such that the lower sealing cup at 60 has pressure balanced on opposite sides thereof so that it performs almost a pure wiping function thereby maintaining the cylinder wall clean.

This greatly enhances the life to be expected of the other sealing cup at 62. It will, therefore, be evident that after the supply of lubricant has been exhausted, or even without any lubricant at all, many advantages are obtained from the illustrated structure.

It will be understood that this invention is susceptible to modification in order to adapt it to different usages and conditions and accordingly, it is desired to comprehend such modifications within this invention as may fall within the scope of the appended claims.

What is claimed is:

1. A piston for a fluid displacement unit comprising; a body, spaced seal members on the body for sliding engagement with the wall of the cylinder in which the piston reciprocates, and means for maintaining a body of lubricant in the space around the body and between said seal members and at substantially the same pressure as is developed on the working area of said piston.

2. A piston for a fluid displacement unit comprising; a body, spaced seal members on the body for sliding engagement with the wall of the cylinder in which the piston reciprocates, a chamber in the body communicating with the space around the body and between said seal members, a body of lubricant in the said chamber and said space, and means for maintaining said body of lubricant substantially at the same pressure as is developed on the working area of said piston.

3. A piston for a fluid displacement unit comprising; a body, spaced seal members on the body for sliding engagement with the wall of the cylinder in which the piston reciprocates, a chamber in the body communicating at one end with the space around the body and between said seal members and communicating at the other end with the work area of said piston, a body of lubricant in said chamber and said space, and means interposed between said body of lubricant and the said working area of said piston to transmit the pressure on the said working face to said body of lubricant.

4. A piston for a fluid displacement unit comprising; a body, spaced seal members on the body for sliding engagement with the wall of the cylinder in which the piston reciprocates, a chamber in the body communicating at one end with the space around the body and between said seal members and communicating at the other end with the working area of said piston, and a porous member interposed between said space and the said working area of said piston to transmit the pressure on the said working face to said space while preventing particulate material from passing into said chamber from the working side of said piston.

5. A piston for a fluid displacement unit comprising; a body, spaced seal members on the body for sliding engagement with the wall of the cylinder in which the piston reciprocates, a chamber in the body communicating at one end with the space around the body and between said seal members and communicating at the other end with the working area of said piston, said other end of said chamber being flared outwardly, a filter disc in the flared out other end of said passage, and means holding said filter disc in place in said passage, said filter disc being operable to pass liquids therethrough but preventing particulate material from passing therethrough.

6. A piston for a fluid displacement unit comprising; a rod-like body, spaced rubber-like sealing cups on said body adapted for sliding engagement with the wall of the cylinder in which said piston reciprocates, an axial bore in said body extending from the pressure chamber confined in the cylinder by said piston through said body to the space surrounding the body between said sealing cups, and a filter disc in said bore at the end thereof communicating with said pressure chamber whereby the pressure in the pressure chamber is conveyed to the space between said sealing cups but whereby particulate material is prevented from passing from the chamber into said bore.

References Cited in the file of this patent

UNITED STATES PATENTS

| | | |
|---|---|---|
| 1,742,959 | King | Jan. 7, 1930 |
| 2,170,266 | Leissner | Aug. 22, 1939 |
| 2,268,544 | Coberly | Jan. 6, 1942 |